United States Patent [19]

Weimer

[11] 3,900,743

[45] Aug. 19, 1975

[54] CHARGE AMPLIFIER

[75] Inventor: Paul Kessler Weimer, Princeton, N.J.

[73] Assignee: RCA Corporation, New York, N.Y.

[22] Filed: Aug. 31, 1973

[21] Appl. No.: 393,554

[30] Foreign Application Priority Data

Sept. 25, 1972 United Kingdom ............... 44294/72

[52] U.S. Cl. ..... 307/221 D; 307/221 C; 307/224 C; 307/264; 307/DIG. 1; 357/24

[51] Int. Cl.[2] .................. G11C 19/28; G11C 19/18; H01L 29/78

[58] Field of Search ........ 307/221 R, 221 C, 221 D, 307/223 R, 223 C, 224 R, 224 C, 225 R, 225 C, 246, 264, DIG. 1; 328/37, 51; 317/235 B, 235 G

[56] References Cited

UNITED STATES PATENTS

| | | | |
|---|---|---|---|
| 3,546,490 | 12/1970 | Sangster | 307/221 D X |
| 3,671,771 | 6/1972 | Sangster | 307/221 R X |
| 3,789,239 | 1/1974 | Heeren | 307/221 C |

OTHER PUBLICATIONS

Tompsett, "Charge-Coupled and Carrier-Domain Devices"; 1971, IEEE Internat'l Solid-State Circuits Conference, pp. 160-161; 2/19/71; Digest of Technical Papers.

Millman et al., "Electronic Devices and Circuits"; pp. 384, 400-411; McGraw-Hill Book Co.; 1967.

Sangster, "The Bucket-Brigade Delay Line, A Shift Register for Analog Signals", Philips Technical Review (pub.), Vol. 31, 1970, No. 4, pp. 97-110.

Sangster & Teer, "Bucket-Brigade Electronics-New Possibilities for Delay, Time-Axis Conversion, & Scanning", IEEE Journal of Solid-State Circuits, Vol. sc-4, No. 3, 6/1969; pp. 131-136.

*Primary Examiner*—Michael J. Lynch
*Assistant Examiner*—L. N. Anagnos
*Attorney, Agent, or Firm*—H. Christoffersen; Henry I. Schanzer

[57] ABSTRACT

Amplifier circuits including a transistor having its control element connected to one terminal of a first capacitor and having one end of its conduction path connected to one terminal of a second capacitor of greater capacity than the first capacitor. A pulse applied to the other terminal of the second capacitor is coupled through the capacitor to the transistor. The pulse is of sufficient amplitude and polarity to enable conduction through the transistor causing it to charge or discharge the second capacitor an amount proportional to the signal present at said first capacitor. The first capacitor may be the output of a first charge transfer stage register and the second capacitor may be the input of a second charge transfer register.

9 Claims, 9 Drawing Figures

CHARGE AMPLIFIER

This invention is directed to means for amplifying signals, particularly low level signals.

In many applications, extremely low signal levels are produced. For example, in charge transfer circuits, of the charge coupled or bucket brigade type, small amounts of charge signals are produced or stored across capacitors having a value of the order of a few picofarads. The charge signals may be so small that in order to drive a load device it is desirable and/or necessary to first amplify the charge signal at the output of these charge transfer circuits. Also, charge transfer circuits may form very long registers and, since there is some loss of signal along the registers, it is necessary to amplify the charge signal being propagated at intermediate points along these registers. However, the combination of the small capacitance and the small amount of charge signal (which may be of the order of picocoulombs) imposes severe limitations on any amplifying means coupled to these charge transfer circuits. The input capacitance of the amplifying means must be very low (a few picofarads) or else the charge signal will be significantly attenuated. Also, the power required to drive the amplifying means must be very low since there is very little energy in the charge signal. Furthermore, the amplifying means should be simple and, though not necessary, should be compatible, processwise, with the charge transfer circuits to which it is connected.

FIG. 1 shows a prior art charge amplifier circuit published in the *IEEE Journal of Solid State Circuits*, June, 1969, in an article entitled "Bucket-Brigade Electronics - New Possibilities For Delay, Time-Axis Conversion and Scanning" by F. L. J. Sangster and K. Teer. FIG. 1 of the instant application corresponds to FIG. 4 of the article. FIG. 1 includes a bipolar transistor Q1 having its base electrode connected to the collector of a transistor Q2, one end of a capacitor C11, the anode of a diode D1 and the emitter of a transistor Q3. Diode D1 is connected at its cathode to the emitter of transistor Q1 and to end of capacitor C1X. The other ends of capacitors C11 and C1X, the collector of Q1 and the base of Q2 are connected to ground potential.

In the operation of the prior art circuit, when transistor Q2 conducts in response to an input signal capacitor C11 is discharged by some amount which lowers the potential at the base of transistor Q1. As a result, transistor Q1 conducts in the emitter follower mode and discharges capacitor C1X. When the clock signal applied to the base of transistor Q3 goes positive, transistor Q3 turns on and conducts a current from capacitor C13 and through the collector-to-emitter path of transistor Q3 which recharges capacitors C1X and C11. The amount of charge supplied to capacitors C11 and C1X produces a corresponding charge deficit across capacitor C13. The charge signal (i.e. the deficit) across C13 is proportional to, and greater than, the signal originally present across capacitor C11 and applied to the base of transistor Q1.

The prior art circuit has many positive features. However, the direct connection between the collector of transistor Q2 and the emitter of transistor Q3 may present a serious disadvantage where transistor Q2 is the output of one register and transistor Q3 is the input to another register. This connection would couple the input register to the output register so that the two registers would not be isolated one from the other. Accordingly, it is a feature of the invention that in amplifying means embodying the invention there is no low impedance connection from the input to the output of the amplifying means.

Also, in the prior art circuit the recharge pulse is simultaneously applied, through diode D1, to the emitter of transistor Q1 and one side of capacitor C1X. In contrast thereto in circuits embodying the invention a capacitor performing the analagous function to capacitor C1X is used to couple the charge or recharge pulse to a transistor.

Circuits embodying the invention include a capacitor connected in series with the conduction path of a transistor. One end of the capacitor is pulsed and the pulse is coupled through the capacitor and applied to the transistor in a direction to enable conduction through said transistor. The transistor, in response to the pulse, charges or discharges the capacitor in an amount proportional to the signal level present at its control electrode.

In the accompanying drawings, like reference characters denote like components; and FIG. 1 is a schematic diagram of a prior art circuit;

Insulated-gate field-effect transistors (IGFETS) are used to illustrate the invention. This is by way of example only and other suitable types of transistors having a control electrode and conduction path may be used to practice the invention.

In the description to follow, IGFETS of P-conductivity type are denoted by the letter P followed by a character and IGFETS of N-conductivity type are denoted by the letter N followed by a character. IGFETS have a control electrode (gate) and first and second electrods (source and drain) defining the ends of a conduction path. An IGFET can conduct current bidirectionally through its conduction path, and which one of the first and second electrodes is the source or the drain depends on the potential applied to these two electrodes. For a P-type IGFET the source electrode is defined as that electrode of the first and second electrodes having the higher potential applied thereto and for an N type IGFET the source electrode is defined as that electrode having the lower potential applied thereto.

Figure 2:
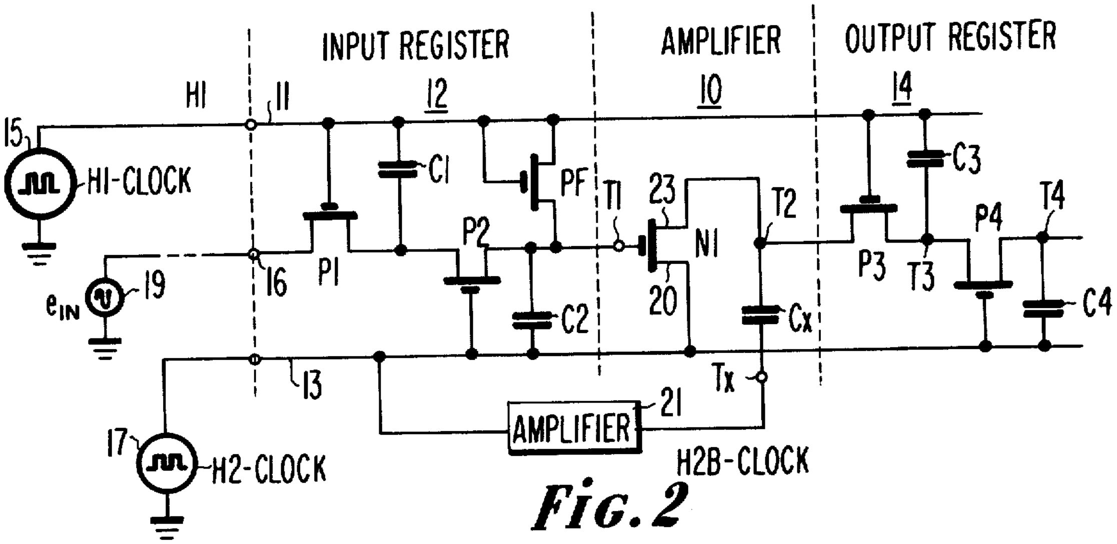
FIG. 2 is a schematic diagram of a circuit embodying the invention.

FIG. 2 illustrates a charge amplifier stage 10 connected at its input, T1, to the output of an input charge transfer register 12 and connected at its output T2 to the input of an output charge transfer register 14. Registers 12 and 14 are known in the art as "bucket-brigade" registers. The input register 12 (only one stage of which is shown) includes transistors P1, P2 and PF. Transistors P1 and PF are connected at their gate electrodes to conductor 11, and transistor P2 is connected at its gate electrode to conductor 13. The source-drain path of transistor P1 is connected between input terminal 16 and node 18, the source-drain path of transistor P2 is connected between node 18 and terminal T1, and the source-drain path of transistor PF is connected between terminal T1 and conductor 11. Each one of transistors P1 and P2 has a capacitor C1 or C2 connected between its gate and drain electrodes, the cappacitors C1, C2 being of sunbstantially equal value.

The amplifier stage includes transistor N1 connected at its gate electrode to input terminal T1, at its first electrode 20 to conductor 13 and at its second electrode 23 to the amplifier stage output terminal T2. A capacitor CX whose capacitance is greater than C1 or C2 is connected between terminals T2 and TX.

The output register 14 includes transistors P3 and P4 having their source-drain paths connected in series between terminals T2 and T4. The gate of transistors P3 is connected to conductor 11 and the gate of transistor P4 is connected to conductor 13. Each transistor has a capacitor C3 or C4 connected between its gate and drain electrodes.

Clock sources 15 and 17 connected to conductors 11 and 13, respectively, supply clock signals denoted H1 and H2, respectively. Amplifier 21, connected between conductor 13 and terminal TX, applies to terminal TX the H2B clock signals which are in phase with the H2 clock signals. The gain of amplifier 21 may be varied to make the amplitude of the H2B singals greater or smaller than that of the H2 signals. Varying the amplitude of the H2B clock signals increases or decreases the constant background charge which is being transferred along with the input signal. Adjustment of the H2B clock amplitude can also be used to correct for deviations in the threshold voltage of the amplifier transistor from an assumed value of zero which causes a modified background signal in the amplifier output. In some applications amplifier 21 may be eliminated and terminal TX is then connected to conductor 13. A source of input signals 19, which may be any transducer suitable for driving a bucket brigade stage, is connected to terminal 16. The combination of source 19 and the input register 12 may be replaced by any signal source capable of driving the amplifier input directly.

Figure 3:
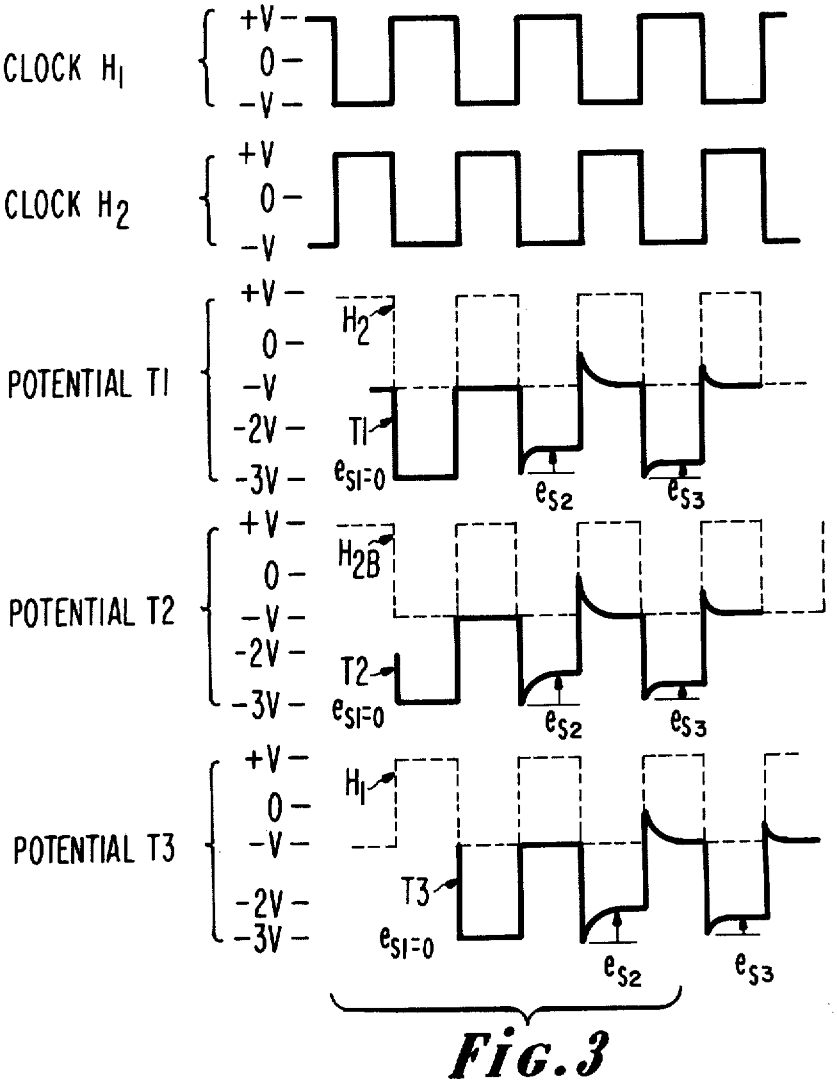
FIG. 3 is a waveform diagram of clock pulses applied to the circuit of FIG. 2 and of waveforms at various points of the circuit of FIG. 2.

The operation of the circuit of FIG. 2 is best understood with reference to the waveforms of FIG. 3. The clock signals H1 and H2 are shown, by way of example, to be complementary and symmetrical and to vary in amplitude between +V and −V volts where V may typically be 3 volts. In the discussion to follow it will be assumed: (1) that the H2B clock pulse is in phase with and of equal amplitude to the H2 clock signal; and (2) that the threshold voltage of the transistors is zero.

A charge signal is propagated along registers 12 and 14 by means of the clock signals H1 and H2. When H1 goes negative (+V volts to −V volts), the odd numbered transistors of registers 12 and 14 and transistor PF are enabled and the even numbered transistors are cut off. When H2 goes negative, the even numbered transistors of the registers are enabled and the odd numbered transistors are cut off.

Thus, when H1 goes negative transistor P1 is enabled and any signal more positive than −V volts presented at node 16 is transferred to node 18. Just prior to H1 going positive and H2 going negative, the potential at node 18 may be expressed as $(-3V + e_s)$ volts, where $e_s$is the signal voltage corresponding to the charge signal stored in C1, and the potential at terminal T1 is at −V volts. During the transition when H1 goes positive and H2 goes negative the potential at node 18 rises by $2 \times V$ volts to $(-V + e_s)$ volts and the potential at terminal T1 goes from −V volts to −3V volts. Transistor P2 thus has −V volts applied to its gate, $(-V + e_s)$ volts applied to its source (node 18) and −3V volts applied to its drain (T1). Following the negative going transition of H2, transistor P2 conducts, transferring any charge signal $e_s$ from node 18 to terminal T1. The potential at terminal T1 when H2 goes negative, may then be expressed as $(-3V + e_s)$ volts. As shown in FIG. 3, for $e_s$ + 0 the potential at T1 remains at −3V volts, for values of $e_s$other than zero the potential at T1 is more positive than −3V volts.

The amplifier stage is controlled by the H2 and H2B clock pulses and is enabled when H2 goes negative. In the discussion to follow H2B is assumed identical to H2. When the H2 clock makes a negative going transition, capacitors C2 and CX couple the H2 and H2B block signals, respectively, to terminals T1 and T2, respectively, causing the potential at these two terminals to go instantaneously from −V volts to −3V volts. When H2 goes negative, electrode 20 of transistor N1 connected to conductor 13 is at −V volts and acts as the drain electrode, electrode 23 connected to terminal T2 is at −3V volts and acts as the source electrode, and $(-3V + e_s)$ volts is applied to its gate electrode. For this bias condition transistor N1 operates as a source-follower. Any signal, $e_s$, at the gate of transistor N1 which causes the gate voltage to be more positive than −3V volts causes conventional current to flow from the drain into the source of transistor N1 and into capacitor CX. Current flows in a direction to positively charge capacitor CX until the potential at the source electrode (T2) is equal to $(-3V + e_s)$ volts. When the potential at terminal T2 equals the potential at terminal T1 current flow ceases. The potential at terminal T2 will, therefore, be in phase with the signal at terminal T1 as shown in the waveforms for terminals T1 and T2 in FIG. 3. The negative going H2B pulse is thus coupled through capacitor CX and enables transistor N1, causing electrode 23 to function as the source electrode and inducing a source-drain current to flow which charges capacitor CX by an amount $e_s$ equal to the signal amplitude at input terminal T1.

Since CX is considerably greater than C2 and since the same potential ($e_s$) is present across both capacitors it is obvious that the charge ($Q_x$) stored in CX is proportionately greater than the charge (Q1) stored in C2, (e.g. if CX = 10C1 than $Q_x$ = 10Q1). Accordingly, charge amplification is achieved by means of MOS transistor N1, a capacitor CX whose capacitance is greater than the elemental capacitors (C1, C2) of the input register and by means of properly clocking the capacitor CX and the transistor N1.

When the H2 goes positive the potential at terminals T1 and T2 is raised by 2V volts from $(-3V + e_s)$ volts to $(-V + e_s)$ volts. Concurrently, H1 goes negative from +V volts, to −V volts, turning on transistor P3. Transistor P3 conducts in the source-follower mode and transfers charge signal from capacitor CX to capacitor C3. All the charge signal ($e_s$) at terminal T2 above −V volts is transferred to terminal T3 and the potential at terminal T2 decreases to −V volts. The potential at terminal T2 is thus restored to −V volts at the termination of each amplification cycle. Concurrently, transistor $P_F$ is turned on and restores the potential at terminal T1 to −V volts. Therefore, when H2 goes to +V volts and H1 goes to −V volts, transistor N1 is cut off since it has −V volts applied to its gate (T1) and source (electrode 23), and +V volts applied to its drain (electrode 21).

The potential at terminal T3 is transferred to terminal T4 when the H2 clock goes negative. The amplified charge present across capacitor CX is thus propagated along the output register. The capacitors C3 and C4 may be made substantially equal to capacitor CX. Alternatively, the amplified charge $Q_x$ present at T2 can be converted into voltage amplification at T3 by making capacitor C3 smaller than capacitor CX.

The output register 14 is used by way of example only, and it should be evident that any other suitable utilization device could be connected instead of register 14 to the output T2 of the charge amplifier.

Figure 1:
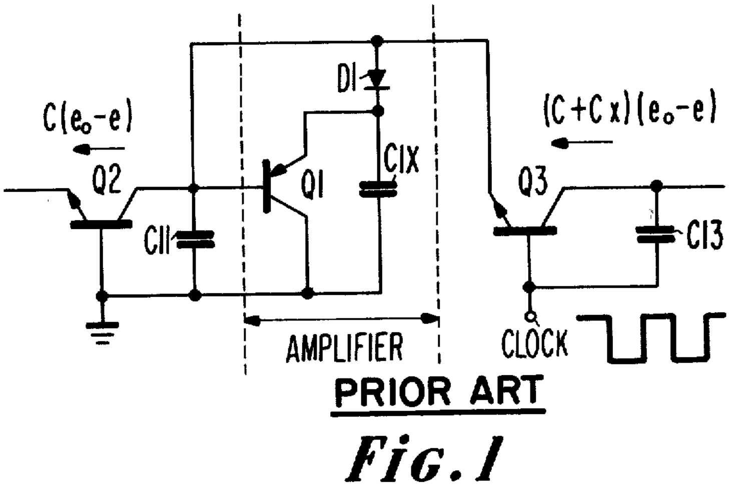
PRIOR ART FIG. 1
Figure 7:
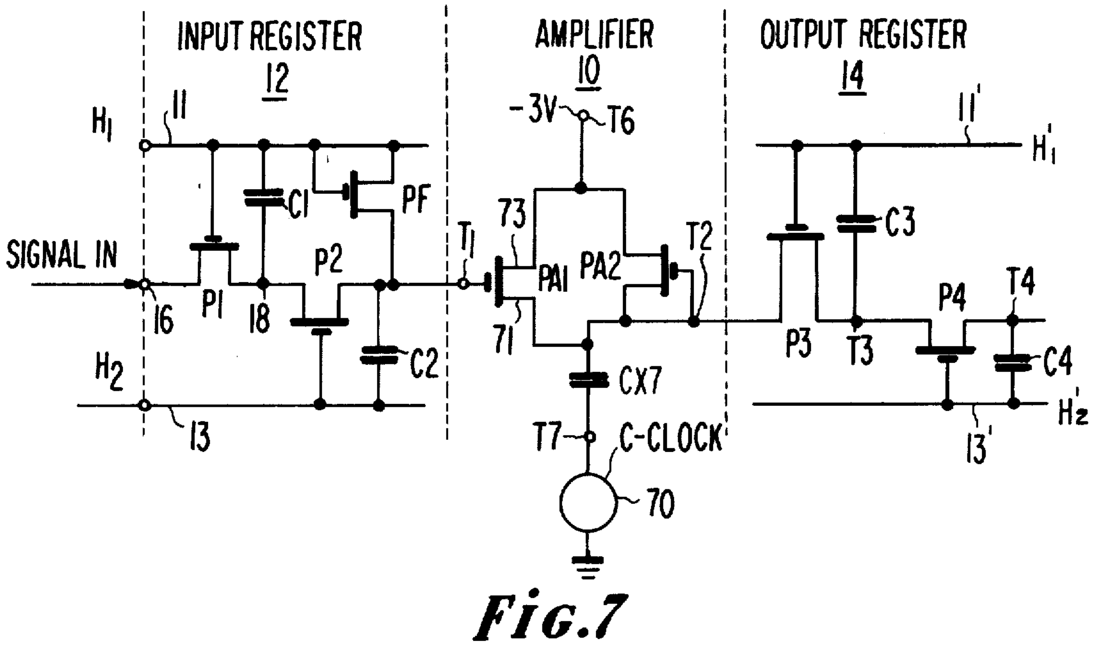
FIG. 7 is a schematic diagram of still another circuit embodying the invention.

The source-follower amplifier circuit (N1 and CX) is linear, stable and can be fabricated in integrated circuit form. No resistive load which could act as a source of thermal noise is required at either its input or its output. A disadvantage of the circuit of FIG. 2, like that of the prior art circuit of FIG. 1, is that in order to obtain source-follower action the amplifier stage transistor N1 must be of a different conductivity type than that of the transistors in register 12. This raises possible problems in the fabrication of monolithic integrated circuits including the register and the amplifier. Complementary circuits require extra processing steps which increases cost and cuts yield. To overcome this point, there is shown in FIGS. 4 and 7 two charge amplifiers making use of transistors of the same conductivity type as the registers to which they are connected.

Figure 4:
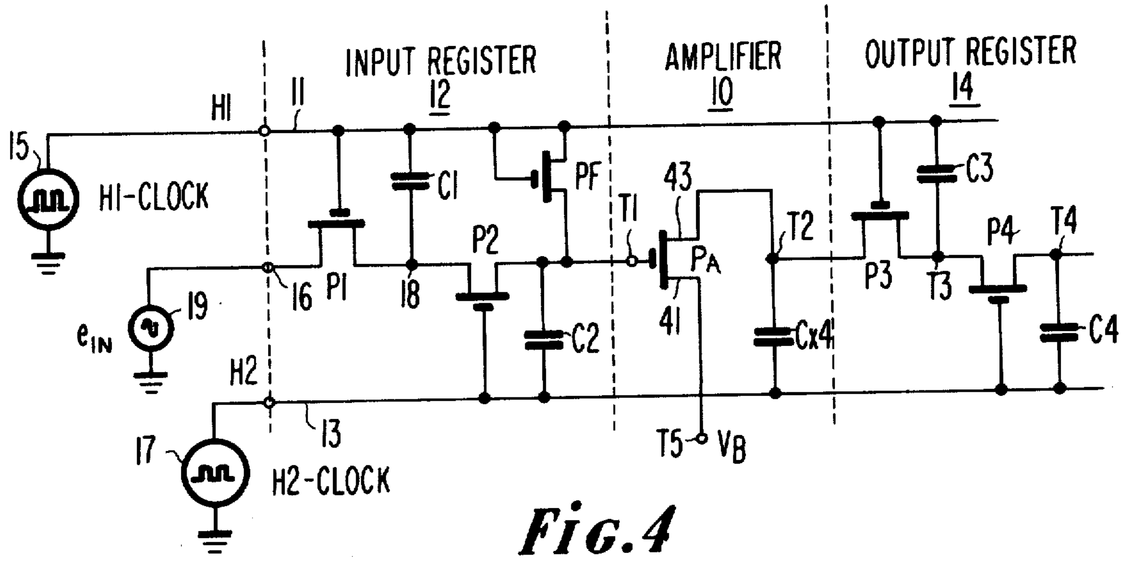
FIG. 4 is a schematic diagram of another circuit embodying the invention.

In the circuit of FIG. 4 the amplifier stage includes a transistor $P_A$ connected at its gate electrode to input terminal T1, at its first electrode 41 to terminal T5 and at its second electrode 43 to output terminal T2. Transistor PA is of the same conductivity type as the transistors of registers 12 and 14 connected to its input and output respectively. Registers 12 and 14 are similar to the registers discussed for FIG. 2 and need not be detailed again. A capacitor CX4 which is of greater capacity than capacitor C1 or C2 is connected between terminal T2 and conductor 13. An adjustable bias voltage $V_B$, which in the discussion of the operation of the circuit is assumed to be −V volts, is applied to terminal T5.

Figure 5:
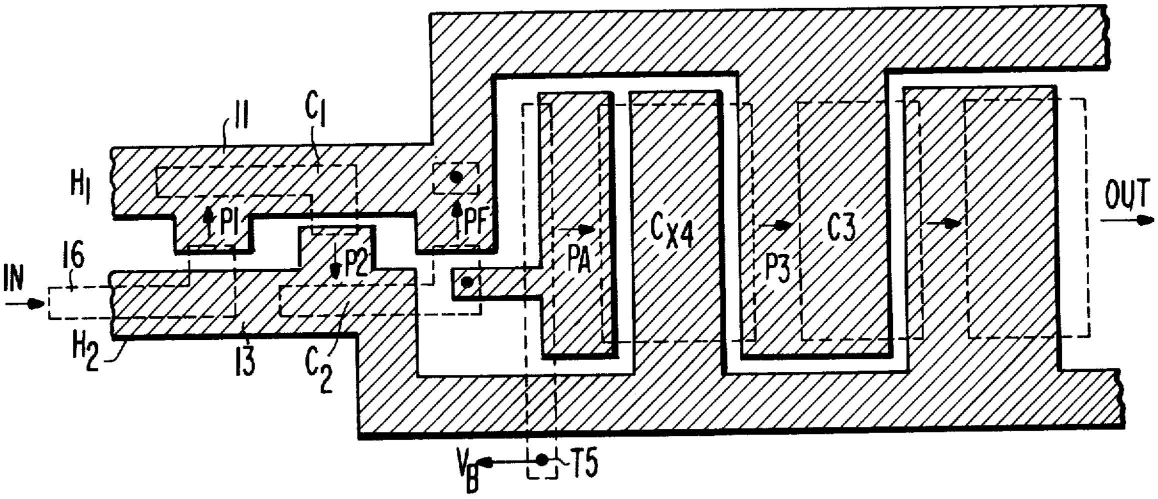
FIG. 5 is a top view of the metallization and layout of the circuit of FIG. 4.

In this configuration, transistor $P_A$ operates as an inverter and produces at terminal T2 a signal which is greater than, and the inverse of, the signal present at terminal T1. The signal present at terminal T2 may be coupled to an output register, as shown, or to some other utilization device. The circuit of FIG. 4 may be fabricated as an integrated circuit as shown in FIG. 5. In FIG. 5 the diffused areas are shown by means of dotted lines with the solid lines indicating metal conductors. As shown in FIG. 5 capacitor CX4 may be formed by extending a relatively large metal area over the diffused source region of transistor $P_A$. Capacitors C3 and C4 may be formed similarly to capacitor CX4. The value of these capacitors may be controlled to a relatively high degree of accuracy since their value is a function of the area that they cover and the oxide thickness.

Figure 6:
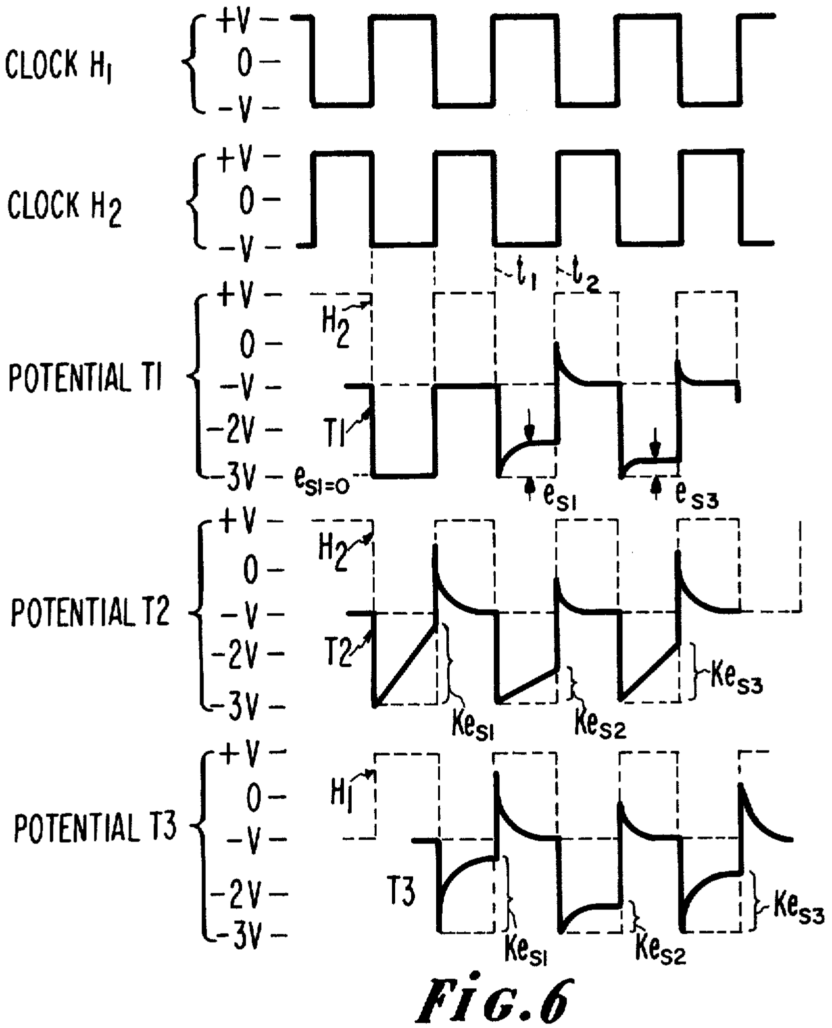
FIG. 6 is a waveform diagram showing the waveforms at various points of the circuit of FIG. 4.

The operation of the circuit of FIG. 4 may best be understood by referring to the waveforms shown in FIG. 6. For ease of explanation the potential at terminal T1 is assumed to be identical to that shown in FIG. 3. For example, at time $t_1$ when the H2 clock signal goes negative: (1) any charge signal present at node 18 is transferred to terminal T1 whose potential may be expressed as $(-3V + e_s)$ volts, and (2) a negative pulse of 2 × V volts amplitude is coupled through CX4 to terminal T2 and the potential at T2 goes from −V volts to −3 volts. As a result, at time $t_1$ transistor $P_A$ has −V volts ($V_B$) applied to electrode 41 (terminal T5) which now functions as the source electrode, −3V volts applied to its electrode 43 (terminal T2) which now functions as the drain electrode and $(-3V + e_s)$ volts applied to its gate electrode (terminal T1). For these bias conditions transistor $P_A$ is enabled and from time $t_1$ to $t_2$ a current flows from terminal T5 through the source-drain path of transistor $P_A$ and into capacitor CX4. The level of the current is inversely proportional to the signal at terminal T1. That is, the lower the signal the greater the conductivity through the transistor and the more positively is capacitor CX4 charged. Thus, the negative going H2 pulse coupled through capacitor CX4 generates a potential differential across the conduction path of transistor $P_A$ which enables conduction therethrough, and the ensuing source-drain current charges the capacitor CX4 an amount inversely proportional to the signal $e_s$ present across C2.

On the positive going transition of the H2 clock pulse, transistor $P_A$ is cut off and the amplifying portion of the cycle is terminated. The gate electrode of transistor $P_A$ is driven to $(-V + e_s)$ volts, electrode 43 is driven positive to −V volts plus the amplified signal accumulated across CX4 and electrode 41 remains at −V volts. Electrode 43 of transistor $P_A$ connected to terminal T2 now functions as the source electrode and electrode 41 connected to terminal T5 functions as the drain electrode. When H2 goes positive, H1 goes negative and transistor P3 is turned on transferring the amplified charge from terminal T2 to terminal T3. The potential at terminals T1, T2 and T3 for three different signal conditions ($e_{s1}$, $e_{s2}$, and $e_{s3}$) is illustrated in FIG. 6.

Although the circuit of FIG. 4 is very similar to that of FIG. 2, the use of an amplifier transistor ($P_A$) of the same type as the transistors in the input register necessitates a different mode of operation. The capacitor (CX4) serves as a load connected to the drain of the amplifier transistor ($P_A$) so that signal inversion occurs. Voltage amplification and background charge in the output may be controlled to some extent by adjustment of the $V_B$ bias. In the circuit of FIG. 4 care must be taken in the choice of operating voltages to avoid saturation of the transistor and limiting of signals.

Figure 9:
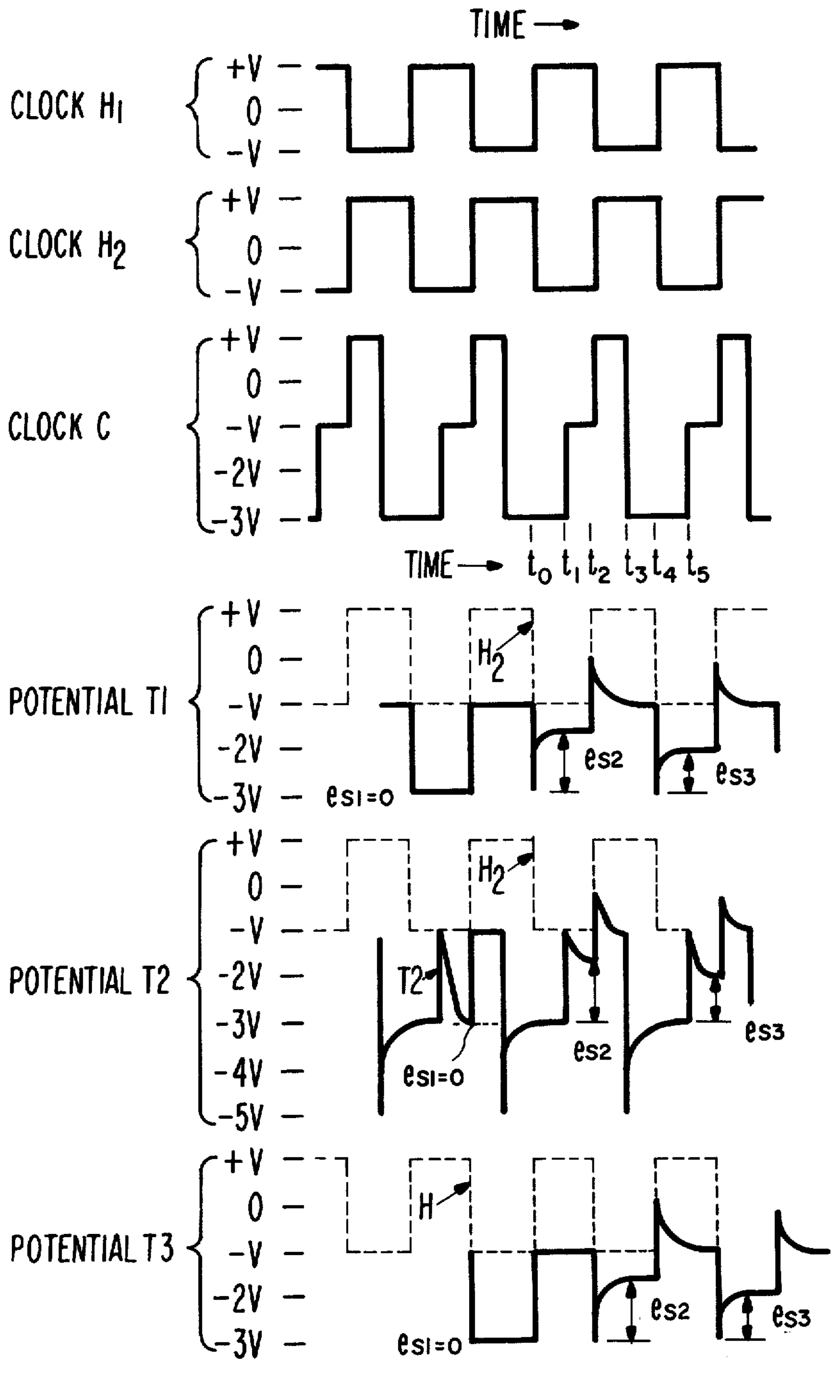
FIG. 9 is a drawing of waveforms present in the circuit of FIG. 7.

FIG. 7 shows a charge amplifier circuit 10 which operates as a source follower without requiring a complementary transistor. The charge amplifier circuit 10 includes transistors $P_{A1}$, $P_{A2}$ and capacitor CX7. The gate of transistor $P_{A1}$ is connected to terminal T1 and the gate of transistor $P_{A2}$ is connected to terminal T2. The source-drain paths of transistors $P_{A1}$ and $P_{A2}$ are connected in parallel between terminals T6 and T2. Capacitor CX7 is connected between terminal T2 and terminal T7. Capacitor CX7 is greater than capacitor C2. A source 70 adapted to produce a signal of the type shown in the waveform labelled C-clock in FIG. 9 is connected to terminal T7 and a D. C. bias voltage having a value of −3V volts is applied to terminal T6.

The input T1 and the output T2 of the charge amplifier are connected respectively to input and output registers 12 and 14. Registers 12 and 14 are similar to those described for FIG. 2 above and need not be detailed. Note, however, that input register 12 is operated by the H1 and H2 clocks applied to conductors 11 and 13, respectively, and that register 14 is operated by H1′ and H2′ clocks appiled to conductors 11′ and 13′, respectively. Suffice it to say that the amplifier transistors and those of the input and output registers are all of the same conductivity type.

Figure 8:
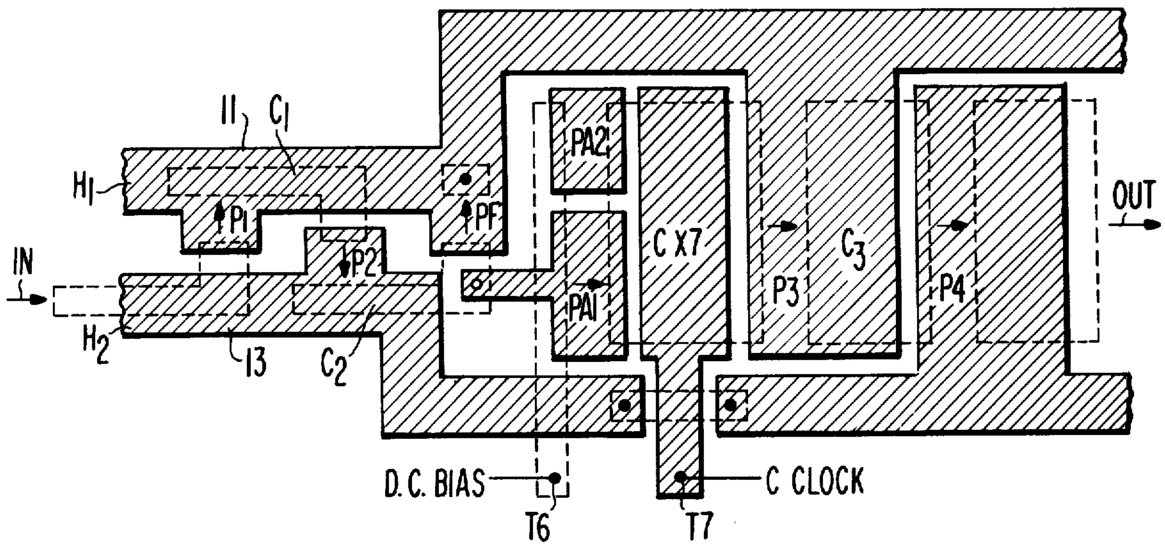
FIG. 8 is a top view of the metallization pattern and layout of the circuit of FIG. 7.

The circuit of FIG. 7 may be formed as shown in FIG. 8 which displays a top view of the circuit. In FIG. 8 the dotted areas indicate diffused regions and the solid lines indicate metal conductor regions. Transistors $P_{A1}$ and $P_{A2}$ may be formed, as shown sharing a common source region to which is applied to the D.C. bias. Overlaying the common source region of transistors $P_{A1}$ and $P_{A2}$ is a metal region for forming the capacitor CX7 and to which the C-clock is applied.

The operation of the circuit of FIG. 7 is best understood with reference to the waveform shown in FIG. 9. Assume first that H1′ and H2′ are identical to and common with H1 and H2, respectively. Also assume, as shown, that at time $t_0$ the H2 clock makes a negative going transition and that the H1 clock makes a positive going transition. Assume also that the voltage level at terminal T1 at time $t_0$ is $(-3V + e_s)$ volts. Just prior to time $t_1$ transistor $P_{A1}$ has $(-3V + e_s)$ volts applied to its gate electrode, (terminal T1) and −3V volts applied to its drain and source electrodes (terminals T2 and T6). (For $e_s = 0$ the gate potential is also −3V volts). Transistor $P_{A1}$ is cut off since the potential at its drain and source is more negative than its gate potential.

At time $t_1$ the C-clock connected to one end of capacitor CX7 makes a positive going excursion from −3V volts to −V volts. Capacitor CX7 couples the change in voltage (2×V volts) to terminal T2 and the potential at T2 goes from −3V to −V volts. Therefore, at time $t_1$ transistor $P_{A1}$ has −V volts applied to electrode 71 which now functions as the source, −3V volts applied to its drain (electrode 73) and $(-3V + e_s)$ volts applied to its gate electrode. From time $t_1$ to $t_2$ transistor $P_{A1}$ conducts in the source-follower mode. Conventional current flow through capacitor CX7 and from terminal T2 through source-drain path of transistor $P_{A1}$ into terminal T6. Transistor $P_{A1}$ conducts current until the potential at terminal T2 decreases from −V volts to $(-3V + e_s)$ volts. That is, transistor $P_{A1}$ conducts until its source potential (T2) is equal to its gate potential (T1). At that point, transistor $P_{A1}$ cuts off, (as above, all transistors are assumed to have zero threshold voltage). Thus, the positive going C-clock pulse is coupled through capacitor CX7 and turns on transistor $P_{A1}$ causing electrode 71 to function as the source electrode and inducing a source-drain current to flow which discharges the capacitor CX7 until the source potential equals the gate potential. Since capacitor CX7 is larger than C2 there has been charge amplification since the same charge signal ($e_s$) is present across capacitors C2 and CX7.

At time $t_2$ the H1 clock goes negative and H2 clock goes positive. During this phase of the H1 and H2 clock signals, transistors P1, PF and P3 are enabled and transistors P2 and P4 are cut off. From time $t_2$ to $t_3$ the signal present at terminal T2 is transferred to terminal T3 of the output register. The transfer of the charge signal occurs as follows. At time $t_2$ the C-clock (again) makes a positive going transition from −V volts to +V volts. This pulse applied to terminal T7 is coupled through capacitor CX7 to terminal T2 and raises its potential by 2×V volts to $(-V + e_s)$ volts. Accordingly, transistor P3 (which is enabled by H1 being at −V volts) conducts, discharging the potential at terminal T2 to −V volts and transferring the charge corresponding to $e_s$ to terminal T3. The charge signal developed at terminal T3 can then be transferred down the output register.

At time $t_2$ the gate potential of transistor $P_{A1}$, which is identical to the potential at terminal T1, goes from $(-3V + e_s)$ volts to $(-V + e_s)$ volts due to the positive 2V volts transition of H2. Concurrently, the drain (terminal T6) of $P_{A1}$ is at −3V volts and the source (terminal T2) is $(-V + e_s)$ volts. From time $t_2$ to $t_3$ the gate and source potential of transistor $P_{A1}$ decays from $(-V + e_s)$ volts to −V volts and transistor $P_{A1}$ is cut off during this time interval. It has thus been shown that charge can be amplified by means of a transistor $P_{A1}$ of the same conductivity type as the other transistors of the register and that its output can be coupled to an output register or other utilization device comprised of transistors of the same conductivity type.

It remains to be shown that the initial condition of −3V volts at terminal T2 can be re-established. At time $t_3$ the C-clock makes a negative going excursion from +V volts to −3V volts. The negative going excursion of 4V volts amplitude is instantaneously coupled through transistor CX7 to terminal T2. This potential instantaneously cuts off transistor $P_{A1}$ since its gate potential is at −V volts. Transistor $P_{A2}$ whose gate electrode is connected to terminal T2 is turned on. It conducts in the common source mode and clamps terminal T2 to −3V volts. Transistor $P_{A2}$ thus functions to restore the output of the amplifier (terminal T2) to the initial voltage level of −3V volts.

The time interval $t_3 - t_5$ is used to recharge the capacitor CX7 so that the entire sequence can be repeated on the next clock cycle. During the periods $t_1 - t_2$ and $t_2 - t_3$ charge was removed from terminal T2 while during the period $t_3 - t_5$ charge is restored to terminal T2 through transistor $P_{A2}$, which is turned on when the potential at T2 is switched from −V to −5V by the negative swing of the C-clock. During the period $t_3$ to $t_4$, the potential at T2 rises from −5V to −3V which restores the potential at terminal T2 to the potential initially assumed at time $t_0$. The bakcground charge in the output signal can be increased or decreased from that present in the input signal by adjustment of the C-clock amplitude.

The stability, linearity and ease of control of this circuit should be equivalent to that of the circuit shown in FIG. 2.

The division of the clock cycle into three subperiods by the waveform of the C-clock enables source-follower operation with an amplifier transistor whose conductivity type is the same as that of the input register. Although only one quarter of each cycle is available for the first and second discharge of CX7, lack of total discharge would have negligible effect on the operating speed or on gain. A full half cycle ($t_3$ to $t_5$) is available for restoring the charge on CX7 so that the amplifier stage should be able to operate fully as fast as the input and output registers themselves.

Another way in which charge can be amplified with the source-follower circuits shown in FIGS. 2 and 7 besides making CX7 larger than $C_2$ is to charge CX7 more than once during each input clock cycle. For example, in FIG. 7 assume that the input register 12 is operated by the H1 and H2 clock and the output register is operated by the H1' and H2' clock. The frequency of the clock signals H1' and H2' is a higher frequency than the frequency of the H1 and H2 clock signals. The charge amplifier then provides "multiple copies" at CX7 of each charge packet present at terminal T1 of the input register. The C-clock voltage waveform applied to CX7 would run at the output clock frequency but its shape is modified depending upon the desired voltage levels in the output register.

A large number of source-follower charge amplifiers operating in the multiple-copy mode could be used in a television system where it is desired to repeat a given line of signal a number of times. In this case a row of source-follower charge amplifiers could be used, with one in each vertical column of an image sensor or series-parallel-series delay line. The source-follower type of amplifier is especially useful in parallel-channel applications since its gain is not a sensitive function of the transconductance of the amplifier transistor.

What is claimed is:

1. In combination with a charge transfer register comprised of insulated-gate field-effect devices having a capacitive terminal, means for amplifying the charge at said capacitive terminal, comprising:

an insulated-gate field-effect transistor of same conductivity type as said devices having first and second electrodes defining the ends of a conduction path and a control electrode;

means connecting said control electrode to said capacitive terminal;

a control terminal;

a capacitor whose capacitance is greater than the capacitance at said capacitive terminal;

means connecting said capacitor between said control terminal and one end of the conduction path of said transistor;

means for applying a control signal to said control terminal of a polarity and amplitude to operate said insulated-gate field-effect transistor in the source follower mode for producing a charge signal across said capacitor in phase with and directly proportional to the signal present at said capacitive terminal; and means connected across the conduction path of said transistor responsive to the termination of said control signal for restoring the charge condition existing across said capacitor prior to the application of said control signal.

2. A charge amplifier comprising:

a capacitive input point adapted to receiving signals, an output point, a control terminal, and a first point for the application thereto of a fixed potential;

first and second transistors, each transistor having first and second electrodes defining the ends of a conduction path and a control electrode;

means connecting said control electrode of said first transistor to said input point;

means connecting the conduction paths of said first and second transistors in parallel between said output point and said first point;

means connecting said control electrode of said second transistor to said output point;

a capacitor whose capacitance is greater than the capacitance at said signal input point connected between said control terminal and said output point; and means for enabling said first transistor including means for applying a control signal to said control terminal, said control signal being coupled through said capacitor for application to said first transistor, said control signal having a polarity and amplitude to enable conduction through said first transistor, said first transistor when enabled conducting in a direction to produce a charge signal across said capacitor proportional to the signal present at said input point.

3. The combination as claimed in claim 2 wherein said pulse applied to said control terminal includes: (1) a first portion for producing said charge signal across said capacitor; (2) a second portion for shifting the level of said charge signal at said output point; and (3) a third portion for enabling said second transistor for returning the level at said output point to a predetermined level.

4. The combination as claimed in claim 2 wherein said first and second transistors are insulated-gate field-effect transistors.

5. The combination as claimed in claim 4 wherein said first and second transistors are of the same conductivity type.

6. In combination with a charge transfer register comprised of field-effect semiconductive devices of one conductivity type having a capacitive terminal, means for amplifying the charge at said capacitive terminal comprising:

an additional field-effect semiconductor device of said one conductivity type having first and second electrodes defining the ends of a conduction path and a control electrode;

means connecting said control electrode to said capacitive terminal;

a control terminal;

a capacitor whose capacitance is greater than the capacitance at said capacitive terminal;

means connecting said capacitor between said control terminal and one end of the conduction path of said semiconductor device;

means for applying a control signal to said control terminal of a polarity and amplitude to enable conduction through said additional semiconductor device for producing a charge signal across said capacitor proportional to the signal present at said capacitive terminal; and means connected across the conduction path of said additional field-effect semiconductor device for restoring a predetermined condition across said capacitor in response to the termination of said control signal.

7. The combination as claimed in claim 6 further including a point of fixed potential and means connecting the other end of said conduction path to said point of fixed potential.

8. The conbination as claimed in claim 7 wherein said means responsive to the termination of the control signal includes a second additional semiconductor device of said one conductivity type having a control electrode and a conduction path; and wherein the conduction path of said second additional semiconductor device is connected in parallel with the conduction path of said additional semiconductor device.

9. The combination as claimed in claim 6 further including additional charge transfer register stages connected in series, said additional stages having an input terminal coupled to that side of said capacitor which is coupled to the conduction path of said additional field-effect semiconductor device.

* * * * *